Feb. 26, 1935.  R. W. LUCE  1,992,670
LIGHT SIGNAL DEVICE
Filed Aug. 31, 1929  2 Sheets-Sheet 1
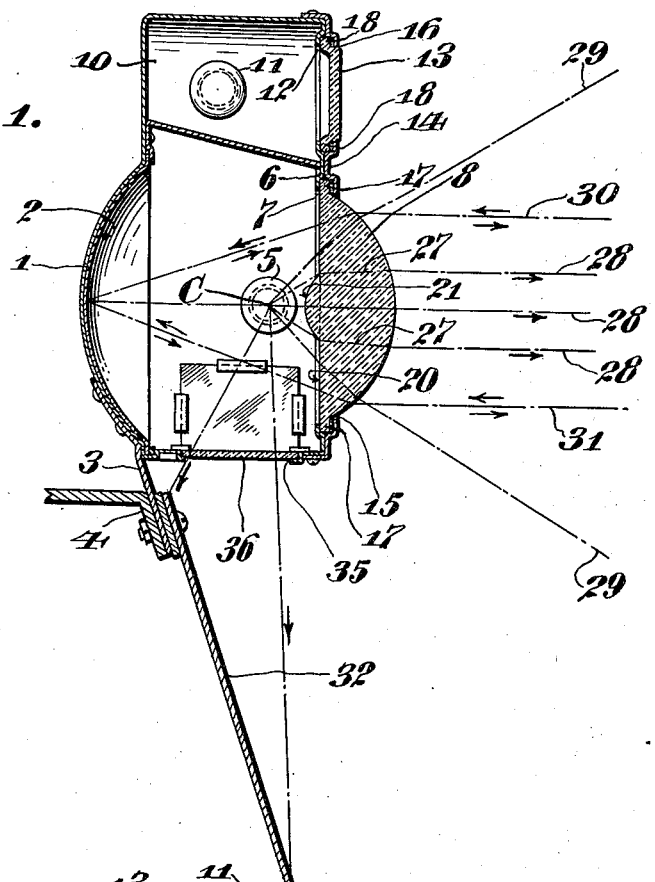
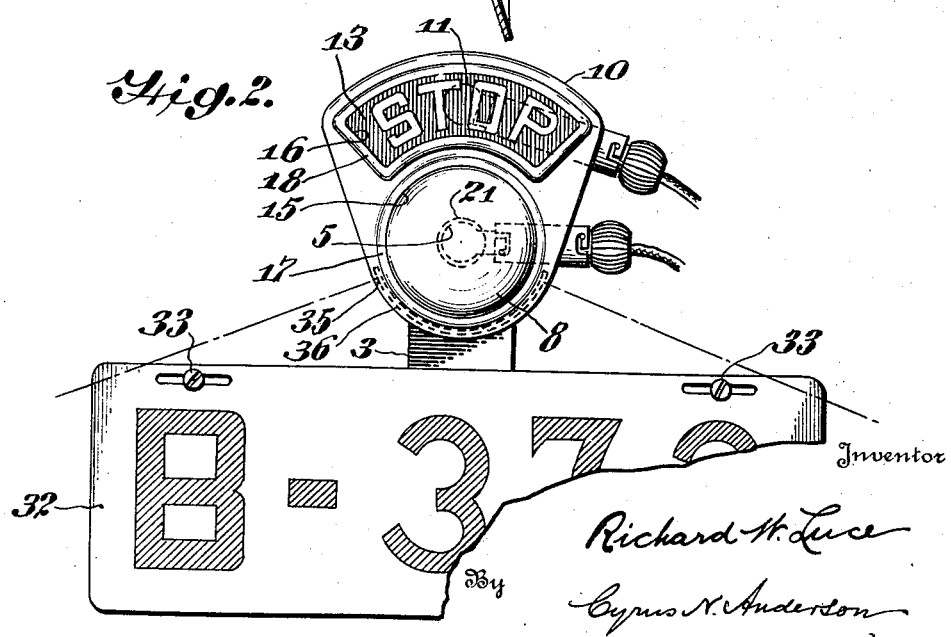
Inventor
Richard W. Luce
By Cyrus N. Anderson
Attorney Feb. 26, 1935.  R. W. LUCE  1,992,670
LIGHT SIGNAL DEVICE
Filed Aug. 31, 1929   2 Sheets-Sheet 2

INVENTOR.
Richard W. Luce,
BY John D. Myers
ATTORNEY.

Patented Feb. 26, 1935

1,992,670

UNITED STATES PATENT OFFICE 1,992,670

LIGHT SIGNAL DEVICE

Richard W. Luce, Mountainside, N. J., assignor to American Gasaccumulator Company, Elizabeth, N. J., a corporation of New Jersey Application August 31, 1929, Serial No. 389,707

10 Claims. (Cl. 177—329)

My invention relates to light signaling devices and includes a source of light whereby light rays are projected from the device outwardly and also includes means whereby the rays of a beam of light from a distant source may be reflected back in a direction toward the said distant source in general parallel relation to the incident rays from said source, and it has for its general object to provide means whereby if the source of light embodied in the device should become ineffective the said device does not become inoperative or useless.

It also is an object of the invention to provide a signaling device comprising a source of light and a reflector in cooperative relation thereto and a light condensing lens located upon the opposite side of the light source from the said reflector, the said lens comprising portions having different light condensing characteristics whereby the device is rendered more effective as a signaling means.

I shall not at this point indicate other objects of the invention but will proceed with the detailed description thereof wherein other and additional objects of the same will be pointed out or else will be apparent from such description.

In order that the invention may be readily understood and its practical advantages fully appreciated reference should be had to the accompanying drawings wherein I have illustrated a device embodying the same, but it should be understood that the invention is susceptible of embodiment in other forms of construction than that shown and that changes in the details of construction may be made within the scope of the appended claims without departing from the said invention or the principle thereof.

In the drawings:

Fig. 1 is a view in central vertical section of a device embodying the invention;

Fig. 2 is a view in front elevation thereof;

Figure 3:
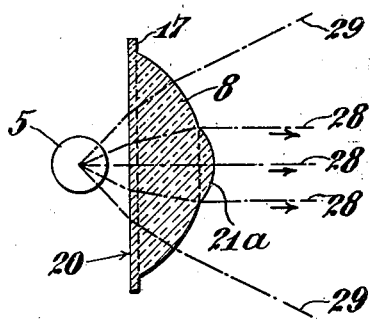
Fig. 3 is a vertical sectional view showing a modified form of lens.

In Figs. 1 and 2 of the drawings I have shown a spherical mirror 1 having a spherical reflecting surface 2. The mirror is supported in any known manner as by means of a bracket 3 which in turn is connected to a bracket 4 or other part of the structure upon which the device may be mounted. An electric light 5 or other suitable source of light is embodied in the device. The source of light 5 is located within a casing the open end of which opposite the mirror 1 is provided with a closure 6 which has an opening 7 therein over which opening is mounted a condensing lens 8.

A casing 10 having an electric or other source of light 11 therein may be provided, as shown, above the casing within which the light source 5 is located. The closure 6 previously referred to extends over the rear open end of the casing 10 and is provided with an opening 12 over which is located a closure 13 of glass or other transparent material which may be clear, red or of any other color. For the purpose of retaining the lens 8 and the closure 13 in position I have provided an outer plate 14 having openings 15 and 16 therein. The edges of the plate surrounding the openings 15 and 16 overlie flange-like parts 17 and 18 which in the construction shown are integral respectively with the lens 8 and the closure plate 13. The light 11, providing the device is employed as a tail light for an automobile, constitutes a stop light, as will be evident by the presence of the word "Stop" which appears in Fig. 2 of the drawings.

The outer or front surface of the lens 8 in the construction as illustrated is spherical while a portion of the inner surface thereof is flat as indicated at 20. The light reflecting surface 2 of the mirror 1 preferably is located in but may be located near the focal plane of the portion of the lens 8 including the flat inner surface 20. In the construction as illustrated in Figs. 1 and 2 the lens 8 is provided upon its inner side with an inwardly extending projection constituting a secondary lens 21 the inner surface of which is spherical so that the portion of the lens comprising the projection 21 and the directly opposed portion of the main lens 8 constitutes a double convex lens. The principal focus of the portion of the lens including the part 21 is located at a point between the spherical reflecting surface 2 and the lens.

Figure 4:
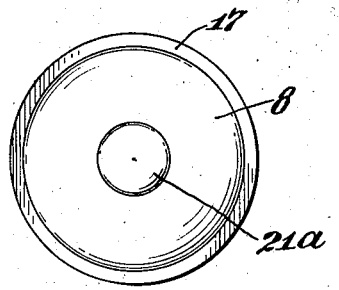
Fig. 4 is a front elevational view of the lens shown in Fig. 3.
Figure 5:
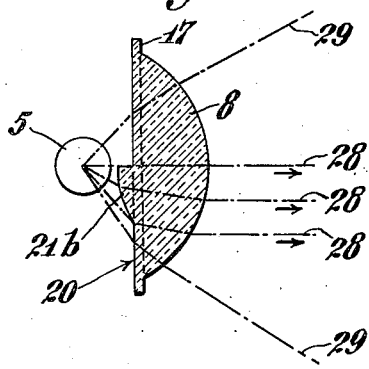
Fig. 5 is a vertical sectional view showing another modified form of lens.
Figure 6:
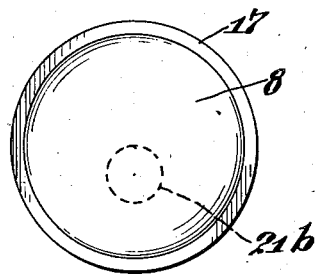
Fig. 6 is a front elevational view of the lens shown in Fig. 5.
Figure 7:
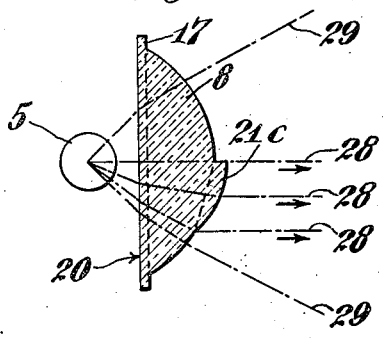
Fig. 7 is a vertical sectional view showing a further modified form of lens.
Figure 8:
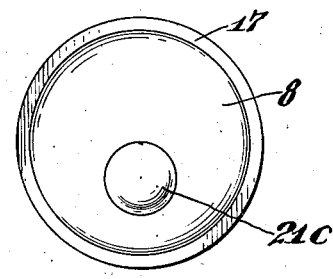
Fig. 8 is a front elevational view of the lens shown in Fig. 7.

In the construction as illustrated in Figs. 1 and 2 the projection 21 is located on the inner side of the lens 8 but it may be located exteriorly thereof and also it may be located at some other point with reference to the edge or periphery of the lens. In any case the lens is of bi-focal character. As shown in Figs. 3 and 4 of the drawings, the secondary lens 21a may be positioned centrally on the front curved surface of the primary lens 8. In Figs. 5 and 6 a construction is shown in which the secondary lens 21b is positioned eccentrically on the rear flat face of the lens 8, and is in the form of a cylindrical projection having a spherical outer end. Figs. 7 and 8 show a lens structure in which the secondary lens 21c is positioned eccentrically on the front curved surface of the lens 8, and is likewise in the form of a cylindrical projection having a spherical outer end. Inasmuch as the operation of the modified forms of lens shown in Figs. 3 to 8 does not differ essentially from the operation of the form shown in Figs. 1 and 2, it will be understood that the description which follows is applicable to the modified forms of lens as well as to the form shown in Figs. 1 and 2.

The lens 8 may be of other construction or design than that shown provided it be of a character such that rays of light from a distant source which enter the device through the lens and impinge upon the light reflecting surface 2 are returned toward the source of light in directions generally or nearly parallel with the entering or incident rays.

The light 5, previously referred to, should be located at or near the principal focus previously referred to which is located between the light reflecting surface 2 and the lens. When so located the rays of light which radiate therefrom and impinge directly upon the spherical surface of the projection 21 in the direction shown are refracted and pass through the lens, emerging therefrom in parallel or substantially parallel directions as indicated by the dash and dot line 28.

As has been indicated already, the portion of the lens 8 having means whereby the principal focus of such portion is located at a point between the lens and the light reflecting surface 2 may be provided at different points upon the lens as shown in the drawings. It is contemplated that the light source 5 shall be placed at or near said principal focus wherever it may be located in the space between the lens and the mirror 1.

The rays of light from the light source which impinge upon the reflector will be reflected thereby and after reflection will impinge upon the inner surface of the lens at various angles, and as a result of their passage through the lens their direction will be changed so as to form a conical beam of light of approximately uniform intensity which will cooperate with the substantially parallel beam of light produced by the rays from the source 5 which impinge directly upon the inner surface of the projection 21. The rays of light from the light source which impinge upon the inner side of the lens at points other than the projecting portion 21 will, after re-direction by their passage through the lens, form a conical beam of light, as indicated by the dash and dot lines 29.

Independently of the illumination of the lens 8 by means of the light which emanates from the light source 5 it also may be illuminated by rays reflected from the reflecting surface 2 which are received from a light source located at a distant point outside of the lens, as for example the head-lights of an automobile. The rays of light from such distant source pass through the lens 8 as indicated by the dash and dot lines 30 and 31. These dash and dot lines indicate that a ray of light which passes into the device along the line 30 is reflected after impinging upon the reflecting surface 2 and passes from the device along the line 31. The reverse likewise is true; that is to say, a ray of light entering the device along the line 31 is reflected by the light reflecting surface 2 and returns along the parallel line 30. In referring to these lines 30 and 31 it has been assumed that the distant light is sufficiently removed from the device that the rays entering the latter therefrom are substantially parallel to each other.

By the arrangement as shown it will be apparent that the illumination which may be effected by the light 5 is or may be augmented by light emitted from a distant source of light. The construction and arrangement as illustrated in Figs. 1 and 2 also provides means whereby the central portion of the device including the double convex portion of the lens 8 may be more brilliantly illuminated than other portions of the device. However, it will be understood that the position of the more brilliantly illuminated portion of the device may be otherwise located as hereinbefore described. The position of the more brilliantly illuminated portion is determined by the position of that portion of the lens structure which has its principal focus at a point between the lens and the light reflecting surface 2 of the mirror.

The device also includes means whereby the exposed surface of the plate 32 may be illuminated, which plate may be provided with numbers or other information-giving means, as indicated in Fig. 2. The plate 32 is supported upon the bracket 3 previously referred to and is secured thereto by means of fastening bolts 33 which also operate to connect the bracket 3 with a supporting bracket or other means 4. In order that the exposed surface of the plate 32 may be illuminated I have provided in the lower side of the casing of the device an opening as indicated at 35 within which is located a transparent sheet of material 36, such as glass, which is curved as indicated in Fig. 2 of the drawings so as to conform to the curvature of the side wall of the casing within which the light 5 is located.

It will be seen that by my invention I have provided a device of simple construction which is highly efficient as a light signaling means. It also will be seen that the device is particularly well adapted for use as the tail-light of an automobile or other vehicle; but as previously indicated it is not intended that devices embodying the invention shall be limited to and for that particular or specific purpose but may be used for any other purpose for which it may be found to be adapted.

As hereinbefore noted, the construction of the device comprising the parts 1 and 8 is such that the rays of a beam of light from a distant source which enter the same through the lens and impinge upon the reflector surface 2 are reflected and return or emerge from the device in directions parallel or nearly parallel with the entering or incident rays; hence such device may be regarded and described as a self-focusing reflector,—the term "self-focusing" being one not infrequently applied to reflectors characterized by their reflection of rays of light from a distant source in directions parallel with the incident rays.

Having thus described my invention what I claim and desire to secure by Letters Patent is:

1. A light signal device comprising a concave reflector, a condensing lens located in front of and in cooperative relation to the said reflectors, said lens comprising a plano-convex outer portion and a double convex central portion, the principal focus of the outer portion being located in said reflector and the principal focus of the central portion being located at a point between the said reflector and the said lens, and a light source located at or near the said principal focus of the central portion.

2. A light signal device comprising a concave reflector having a spherical reflecting surface, a condensing lens located in front of and in cooperative relation to said reflecting surface and having its principal focus in said reflecting surface, said lens having a projection from one side thereof the surface of which projection is spherical, the principal focus of the portion of said lens including the said projection being located at a point between the said lens and the said reflector, and a light source located at or near the position of the principal focus of the portion of the lens which includes, said projection.

3. A light signal device comprising a reflector having a concave spherical reflecting surface, a lens located in front of and in cooperative relation to the said reflecting surface, the outer surface of which is convex and the inner surface of which is provided with a projection the outer surface of which is spherical, the portion of the surface of said lens around the said projection being plane and the principal focus of the portion of said lens including said projection being located at a point between the said portion and the said reflector, and a source of light located at a point at or near the position of the said principal focus, the portion of said lens including said plane-surface having its principal focus in said reflector.

4. A light signal device comprising a concave reflector having a spherical reflecting surface, a lens located in front of and in cooperative relation to the said reflecting surface, the outer surface of which is spherical and the inner surface of the said lens being provided with a projection the outer surface of which is spherical, the said projection forming with the opposing portion of the outer side of the said lens a double convex lens portion the principal focus of which is located at a point between the double convex portion of the lens and the said reflector, the remaining portion of said lens having its principal focus in said reflecting surface, and a light source located at or near the position of the said principal focus of the double convex lens.

5. A light signal device comprising a concave reflector having a spherical light reflecting surface, a lens located in front of said reflector and having its principal focus in said reflecting surface, the outer surface of the said lens being convex, and the said lens having at the central portion of its inner side a convex portion cooperating with the opposing portion of the outer side of said lens to form a double convex lens, the principal focus of the said double convex portion of the lens being located at a point between the said portion and the said reflector, and a light source located at or near the position of the principal focus of said double convex portion.

6. A light signaling device comprising a light reflector having a concave reflecting surface, a lens comprising a plano-convex portion and a double convex portion, the principal focus of the plano-convex portion being located at or near the reflecting surface of the said reflector, and the principal focus of the double convex portion being located at a point between the said reflector and the said lens, and a source of light located at or near the position of the principal focus of the said double convex portion of the said lens.

7. A light signaling device comprising a casing having an opening therein and a concave reflector opposite said opening, a source of light located in said casing in front of said reflector, the light which radiates from the said source of light being projected from the opening in the device in the form of a spreading beam, means for condensing the rays of a portion of said beam to increase the intensity of illumination of said portion and means including said reflector whereby the illumination of a portion of the said beam is augmented by light radiating from a source of light located outside of and a distance from the said device.

8. A light signaling device comprising a casing having an opening therein and a concave reflector opposite said opening, a source of light located within said device in front of the said reflector, the light which radiates from the said source of light being projected from the opening in the device in the form of a spreading beam, means for condensing the rays of light at the central portion of said beam, and means including said reflector whereby the illumination of portions of the said beam including said central portion is augmented by light radiating from a light source located outside of and a distance from the said device.

9. A light signaling device comprising a source of light, a lens located in front of said light and through which light rays which radiate from the said source of light are projected in the form of a beam, the said lens including means for condensing the rays of light constituting the central axial portion of said beam, and means for augmenting the illumination of portions of the said beam including said central axial portion by light received from a source of light exteriorly of the said device.

10. A light signal device comprising a concave reflector, a bi-focal condensing lens located in front of and in co-operative relation to said reflector and in such a position that the principal focus of one portion thereof is in said reflector, the principal focus of the other portion of the lens being located between the lens and the reflector, and a light source located at or near the last mentioned principal focus.

RICHARD W. LUCE.